United States Patent
Morales

(10) Patent No.: US 12,321,652 B2
(45) Date of Patent: Jun. 3, 2025

(54) METHODS AND PRINTING SYSTEM FOR VERIFIED PRODUCTION IN PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 17/701,236

(22) Filed: Mar. 22, 2022

(65) Prior Publication Data
US 2024/0231725 A1    Jul. 11, 2024

(51) Int. Cl.
G06F 3/12       (2006.01)
G06K 15/02      (2006.01)

(52) U.S. Cl.
CPC .......... *G06F 3/1258* (2013.01); *G06F 3/1219* (2013.01); *G06F 3/1285* (2013.01)

(58) Field of Classification Search
None
See application file for complete search history.

(56) References Cited

U.S. PATENT DOCUMENTS

| | | |
|---|---|---|
| 7,493,054 B2 | 2/2009 | Ujigawa |
| 7,839,519 B2 | 11/2010 | Aoki |
| 8,734,034 B2 | 5/2014 | Morovic et al. |
| 2008/0273224 A1* | 11/2008 | Maulsby ................ G06Q 10/10 358/1.15 |
| 2012/0087684 A1* | 4/2012 | Sasaki ................ G03G 15/5062 399/53 |
| 2013/0250312 A1* | 9/2013 | Miyazaki ............... G06K 15/18 358/1.1 |
| 2014/0211234 A1* | 7/2014 | Malik .................... G06F 3/1271 358/1.14 |
| 2016/0086235 A1* | 3/2016 | Shiraiwa .............. B41J 2/17566 347/7 |
| 2017/0060504 A1* | 3/2017 | Nakayama ............ G06F 3/1285 |
| 2019/0050182 A1* | 2/2019 | Wozniak ............... G06F 3/1268 |
| 2019/0196753 A1* | 6/2019 | Minegishi ............ G06F 3/1239 |
| 2020/0285424 A1* | 9/2020 | Matsuzaka ............ G06F 3/1208 |

FOREIGN PATENT DOCUMENTS

| JP | 2005037918 | * | 2/2005 | ............. B41J 29/38 |
|---|---|---|---|---|
| JP | 2020055204 | * | 4/2020 | ............. B41J 29/38 |

* cited by examiner

*Primary Examiner* — Beniyam Menberu
(74) *Attorney, Agent, or Firm* — Millen, White, Zelano & Branigan P.C.; William F. Nixon

(57) ABSTRACT

A printing system includes an estimation system that provides estimates for ink or toner use for a print job at a target printing device. The estimation system retrieves digital job settings, digital front end (DFE) configuration settings, and printing device configuration settings from the target printing device. The estimate for recurring printing operations is stored at the estimation system. As printing instances occur, the estimation system retrieves the estimate along with its associated settings and compares them to current settings applicable at the printing device. Any difference between defined settings and current settings is resolved prior to printing the document. Job costing information also is generated for this instance of printing and provided to the estimation system.

20 Claims, 9 Drawing Sheets

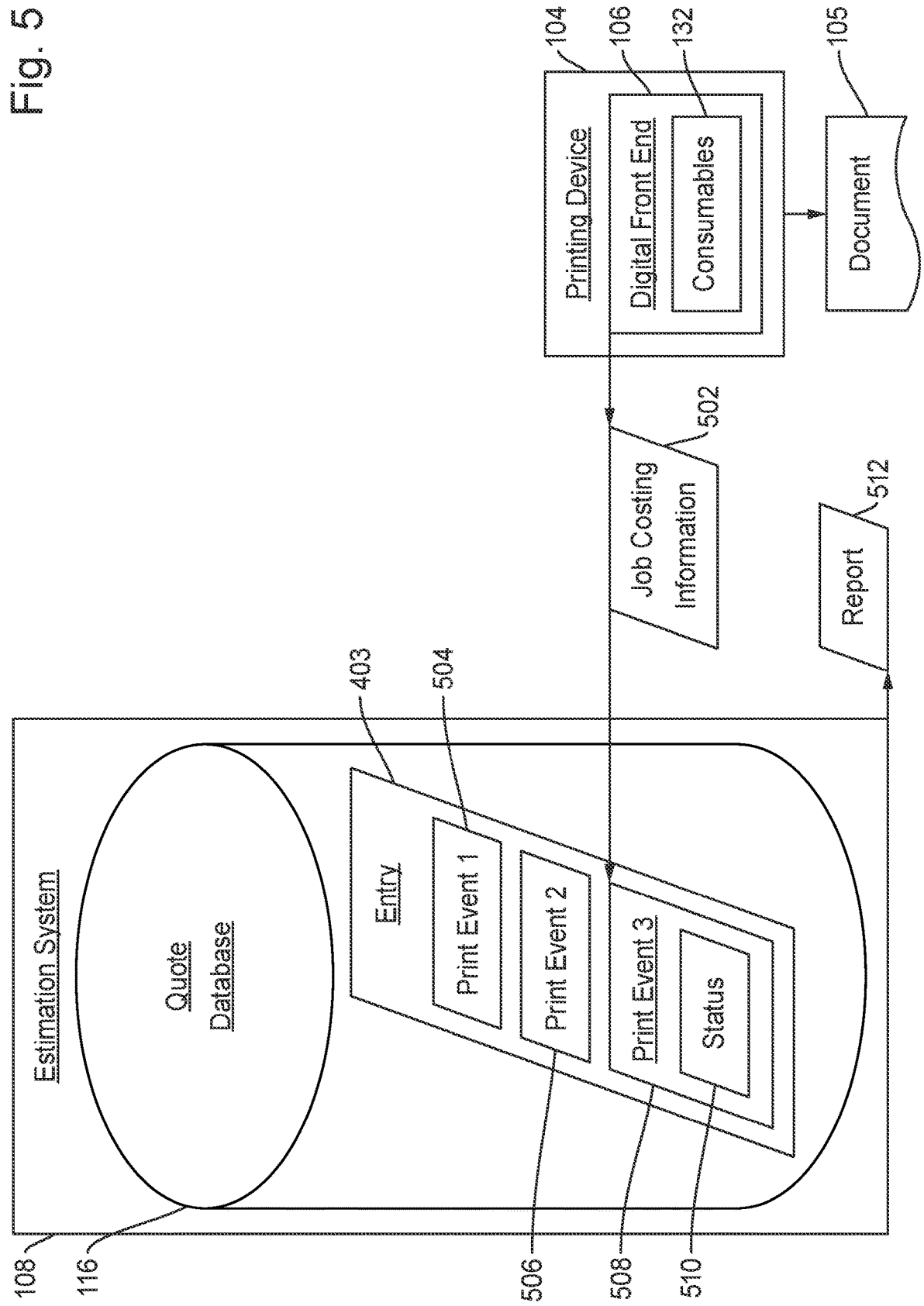

METHODS AND PRINTING SYSTEM FOR VERIFIED PRODUCTION IN PRINTING OPERATIONS

FIELD OF THE INVENTION

The present invention relates to a printing system and associated methods to verify production of print jobs according to ink use estimations as well as job costing and status information generated after completing the print jobs.

DESCRIPTION OF THE RELATED ART

Ink use estimation may be used for print jobs that are estimated once then printed on a recurring basis. For example, credit card statements or utility bills may be printed every month with a basic format that varies little between printing operations. Once a print shop gets a recurring print job, they may agree to print the documents for the print job at a fixed price on a long term basis, such as every month for 5 years. It may be desired that the documents are printed under the same conditions that were used to estimate ink use. Otherwise, the print shop may end up printing the documents for less profit, or worse, at a loss.

SUMMARY OF THE INVENTION

A method for printing operations is disclosed. The method includes retrieving defined settings for an existing ink estimate for a print job. The print job includes a recurring printing operation. The method also includes comparing the defined settings for the existing ink estimate to current settings for a printing system corresponding to the recurring printing operation. The method also includes determining a difference between one of the defined settings and one of the current settings. The difference results in a change from the existing ink estimate. The method also includes updating the one of the current settings to the one of the defined settings. The method also includes printing the print job for the recurring printing operation.

A method for printing operations is disclosed. The method includes retrieving defined settings for an existing ink estimate for a print job. The print job includes a recurring printing operation. The method also includes comparing the defined settings for the existing ink estimate to current settings for a printing system corresponding to the recurring printing operation. The method also includes determining a difference between one of the defined settings and one of the current settings. The difference results in a change from the existing ink estimate. The method also includes selecting whether to match the one of the current settings to the one of the defined settings. The method also includes printing the print job for the recurring printing operation.

A method for printing operations is disclosed. The method includes retrieving defined settings for an existing ink estimate for a print job. The print job includes a recurring printing operation of a plurality of recurring printing operations. The method also includes comparing the defined settings for the existing ink estimate to current settings for a printing system corresponding to the recurring printing operation. The method also includes selecting whether to update the one of the current settings to the one of the defined settings. The method also includes performing the recurring printing operation for the print job. The method also includes creating a print entry for the recurring printing operation of the print job. The print entry includes job costing information and a status. The method also includes providing a report on the print job using the print entry for each of the plurality of recurring printing operations.

A method for printing operations is disclosed. The method includes retrieving defined settings for an existing ink estimate for a print job. The print job includes a recurring printing operation. The method also includes comparing the defined settings for the existing ink estimate to current settings for a printing system corresponding to the recurring printing operation. The method also includes determining a status for the recurring printing operation based on a difference between one of the defined settings and one of the current settings. The difference results in a change from the existing ink estimate.

BRIEF DESCRIPTION OF THE DRAWINGS

Various other features and attendant advantages of the present invention will be more fully appreciated when considered in conjunction with the accompanying drawings.

FIG. 5 illustrates a block diagram of post-print operations using the estimation system according to the disclosed embodiments.

DETAILED DESCRIPTION OF THE PREFERRED EMBODIMENTS

Figure 1A:
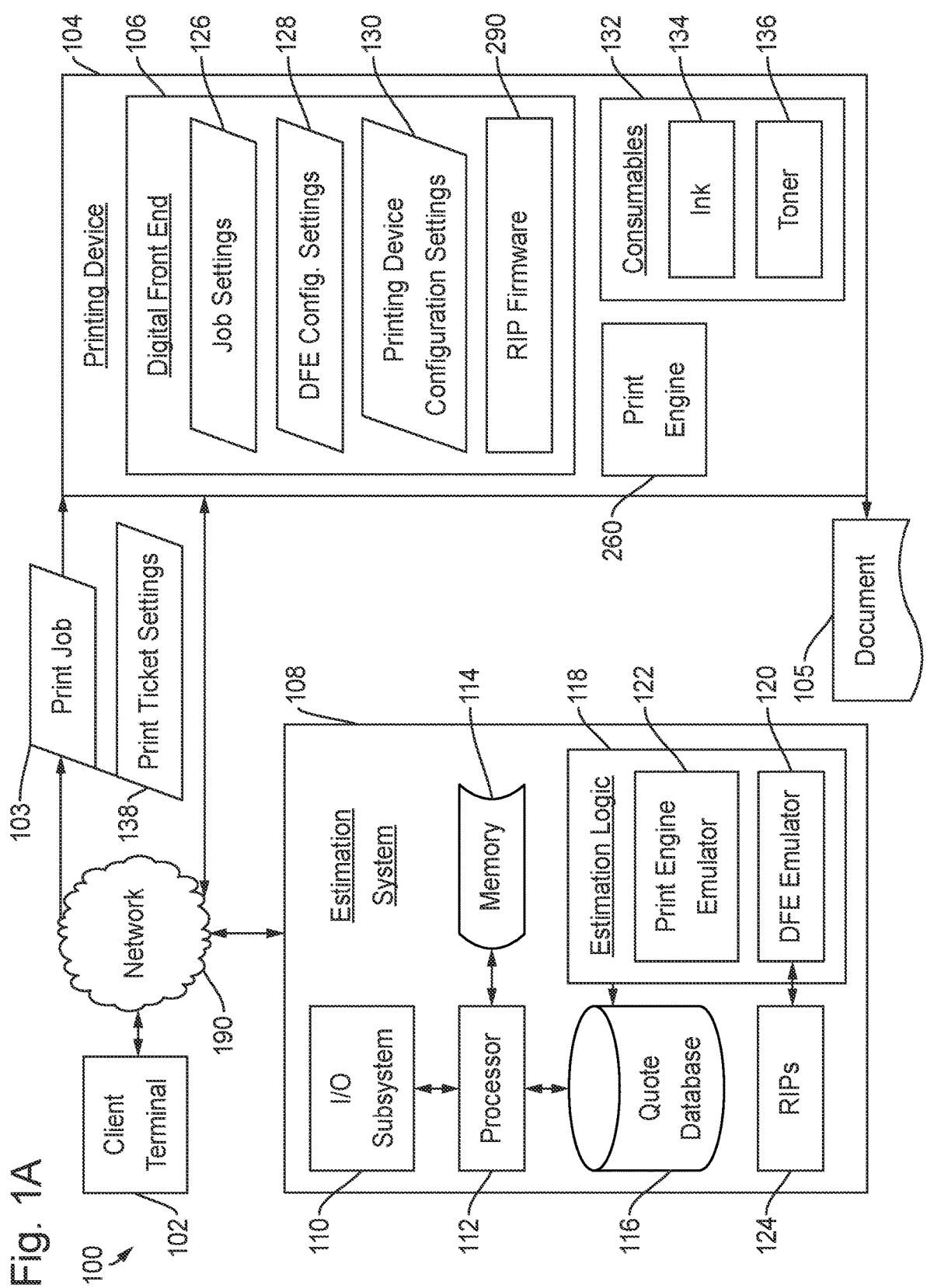
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments include a printing system that leverages the intelligent ink use estimation operations for recurring printing operations and accounts for changes within the printing devices. When an operator estimates ink use, he/she selects a specific printing device and performs ink use estimation. The printing system stores the ink use estimation along with job-specific settings and the configuration for the printing device and its associated DFE. In addition, the ink use estimation is assigned to either a new or existing project within the ink use estimation application. Further, the operator may specify a net profit margin that should be assumed for the print job. The net profit margin is an upcharge to the operating costs that are used to print the print job.

When printing the documents for the production job for the recurring printing operation, the operator associates the print job with an existing ink use estimate. Before printing the print job, the disclosed embodiments retrieve job settings that impact ink use from the ink estimation system. The disclosed embodiments compare these settings with the settings used to process the print job. If there is a difference between the settings, then the disclosed embodiments may display a warning to the operator. The operator may elect to update all job settings to match those used for the ink use estimate. Alternatively, the operator may review job settings and decide whether to match ink use settings for each of the conflicting settings. Optionally, the disclosed embodiments may automatically override job settings to match settings used for ink use estimation.

The disclosed embodiments also retrieve DFE configuration settings that impact ink use from the ink estimation system. The disclosed embodiments may compare these settings with current DFE settings. If there is a difference between the settings, then the disclosed embodiments may display a warning to the operator. The operator may elect to update DFE settings to match settings used to estimate ink use. Alternatively, the operator may elect to process the print job using the current DFE settings.

The disclosed embodiments also retrieve printing device configuration settings that impact ink use from the ink estimation system. The disclosed embodiments may compare these settings with the current printing device settings. If there is a difference between the settings, then the disclosed embodiments may display a warning to the operator. The operator may elect to update printing device settings to match settings used to estimate ink use. This action usually requires entering maintenance mode and restarting the printing device. The disclosed embodiments may provide a "one click" option to the operator to update all settings en masse and restart the printing device. Alternatively, the operator may elect to process the print job using the current printing device settings.

After the print job is printed, the printing device will send job costing information to the ink use estimation system. The ink use estimation system retains printing history for all defined projects. The disclosed embodiments may add another print entry to the history for the project with which the print job is associated.

In addition, the disclosed embodiments may store status information for the print event in the project. This status may be one of the following:

Okay/Accepted—indicates that the print job was printed using the same job ticket, DFE, and printing device settings that were used for the estimation. This status also indicates that the actual costs were the same, or within a specified margin of error, or less than the costs from the initial estimate.

Warning—may indicate one of the following:

Print job was printed using different job settings versus the estimate settings, or different DFE settings versus the estimate settings, or different printing device settings versus the estimates;

Print job costs were higher versus costs from the ink use estimation, however, job costs were lower versus the cost margin for the project. This may indicate that the job was less profitable than desired but the print job was still printed profitably. Cases where the print job was printed using correct settings and the costs were still higher than expected may indicate to the print shop that there is a potential problem that needs to be addressed.

Error—job costs were higher versus the margin costs. This status may indicate that the print shop actually lost money when printing the print job.

It should be noted that job costing information is automatically received by the ink use estimation system. The ink use estimation system also may provide the following project functionality to provide project reports and warning and error notifications. For project reports, these will display the average ink use and costs per page for every print run in a project. They also may display the status for every print run. The operator also may drill down and see details of every print run as these are based on job costing data and include the number of pages, impressions, paper, color management, as well as all relevant settings. For warning and error notifications, the disclosed embodiments will automatically send notifications to defined users when a run has a warning or error status.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100. It may receive print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for ink use estimation. This information includes job settings 126, DFE configuration settings 128, and printing device configuration settings 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such and C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by DFE configuration settings 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, that can control the operation of printing device 104, which impacts the amount of consumables 132 required by the printing device. For example, these settings may include printing device maintenance settings that control or effect head cleaning intervals, head clogging prevention intervals, and the like of printing device 104. Printing device configuration settings 130 also may include spitting, or printing spray pattern over all content, the printing of purge sheets, the printing of spit lines, or lines printed between page frames in a roll-fed printing device to ensure that all jets of the print head fire when instructed.

To lower printing device consumable usage, RIP firmware 290 may be configured via image rasterization parameters of DFE configuration settings 128 to reduce the density for each colorant, convert color images to black and white, and adjust tone reproduction curves (TRCs) to lower printing device use of consumables 132. Gray component replacement levels may be adjusted via DFE configuration settings 128.

The disclosed embodiments also include an estimation system 108 that includes estimation logic to facilitate performance of ink use estimation. Estimation system 108 may include estimation logic 118 having a DFE emulator 120 and a print engine emulator 122 configured to emulate operations performed by DFE 106 and print engine 260 of printing device 104. Print engine 260 is disclosed in greater detail below. DFE emulator 120 and print engine emulator 122 may be configured with job settings 126, DFE configuration settings 128, and printing device configuration settings 130 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Estimation system 108 may be any device within system 100 and connected to network 190 to receive and send data to printing device 104. Estimation system 108 also may be connected to other printing devices within system 100. Preferably, estimation system 108 may be server. It also may be another device, such as a computer. Estimation system 108 includes a memory 114 and a processor 112. Estimation system 108 also includes an input/output (I/O) subsystem 110 and a quote database 116.

Estimation system 108 also may refer to consumable estimation software that executes on a device. As disclosed below, "offline estimation device" may refer to this software.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information 18 to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of RIPs 124 available at estimation system 108. Selection of the appropriate RIP provides a better basis to estimate ink use. For example estimation logic 118 may determine the DFE software version for DFE 106 to select a RIP that has the same version. Estimation system 108 includes many different RIPs 124. Preferably, it includes one for each software version that has been released. DFE emulator 120 may automatically configure the selected RIP using configuration settings from information retrieved from DFE 106.

Print engine emulator 122 may be configured to emulate operations performed by print engine 260 or printing device 104. The emulation may depend on various printing device configuration settings 130 for printing device 104.

Estimates provided using estimation logic 118 of estimation system 108 may be stored as a record or entry in quote database 116. Each entry to quote database 116 may specify aspects associated with an estimate provided to a customer for processing a particular print job 103. Each entry may include field for job settings 128, DFE configuration settings 128, and printing device configuration settings 130 used to provide the estimate as well as a consumables estimate field and a cost field. Other information may be provided such as a client information field, a job information field, or a unique identification (ID) field. Preferably, print job 103 is a recurring printing operation in that multiple instances will occur that involves the printing of document 105.

Figure 1B:
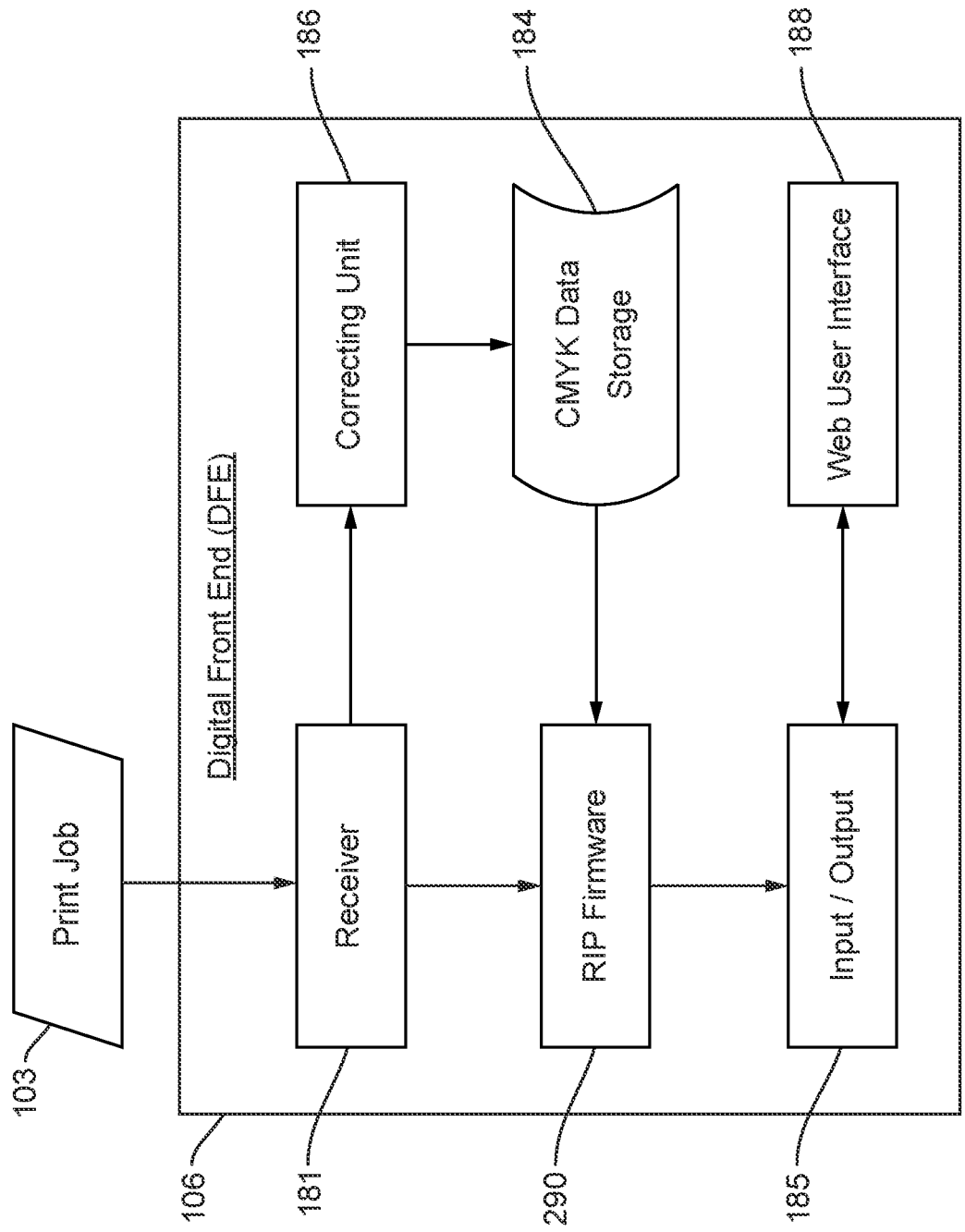
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or job cost device 118, if it is located at a separate device, using, for example, input/output connector 185. Web user interface 188, or web application, allows a user of the DFEs of other printing devices to interact with content or software running on DFE 106.

Figure 2:
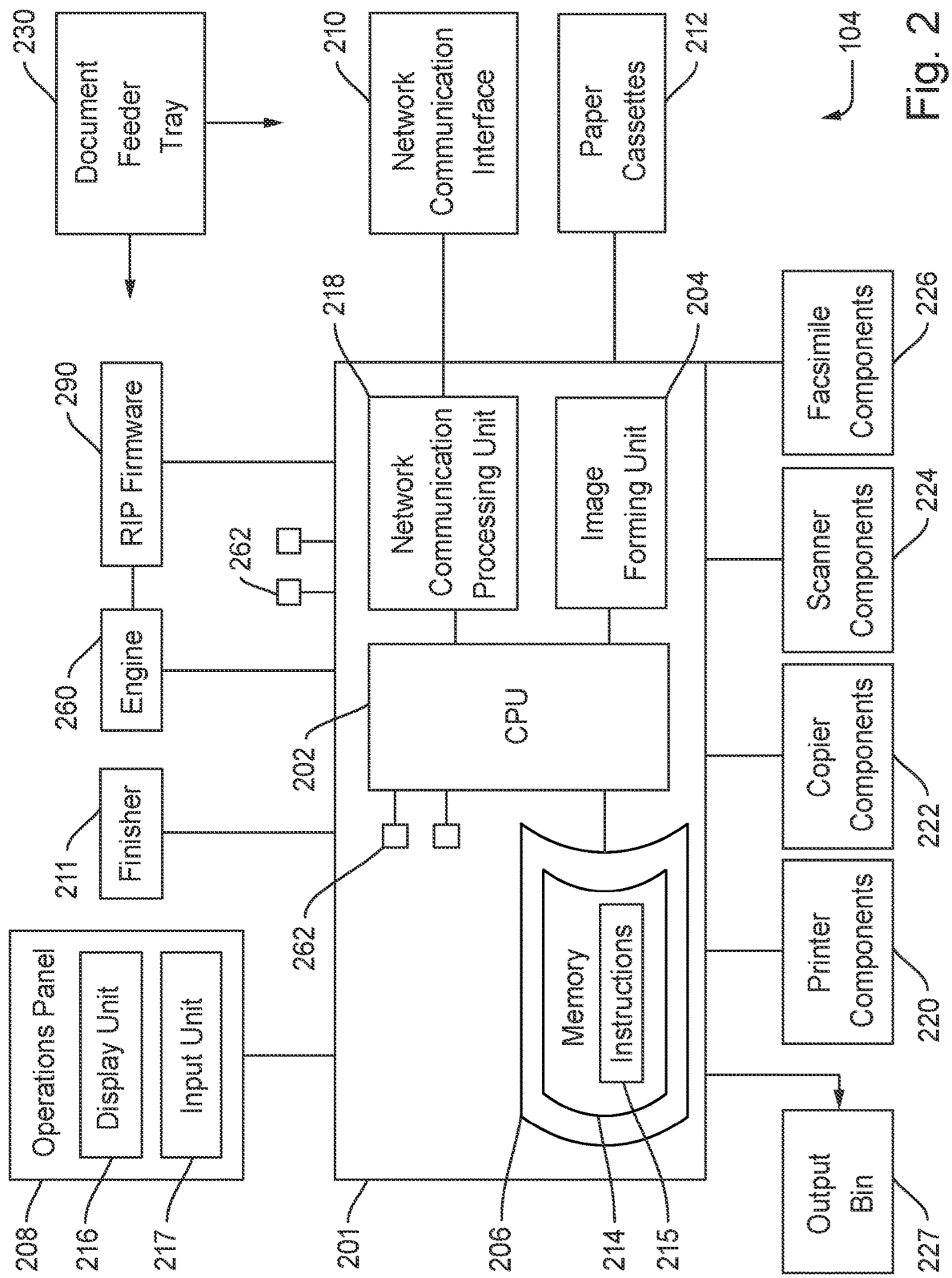
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from estimation system 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Estimation system 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
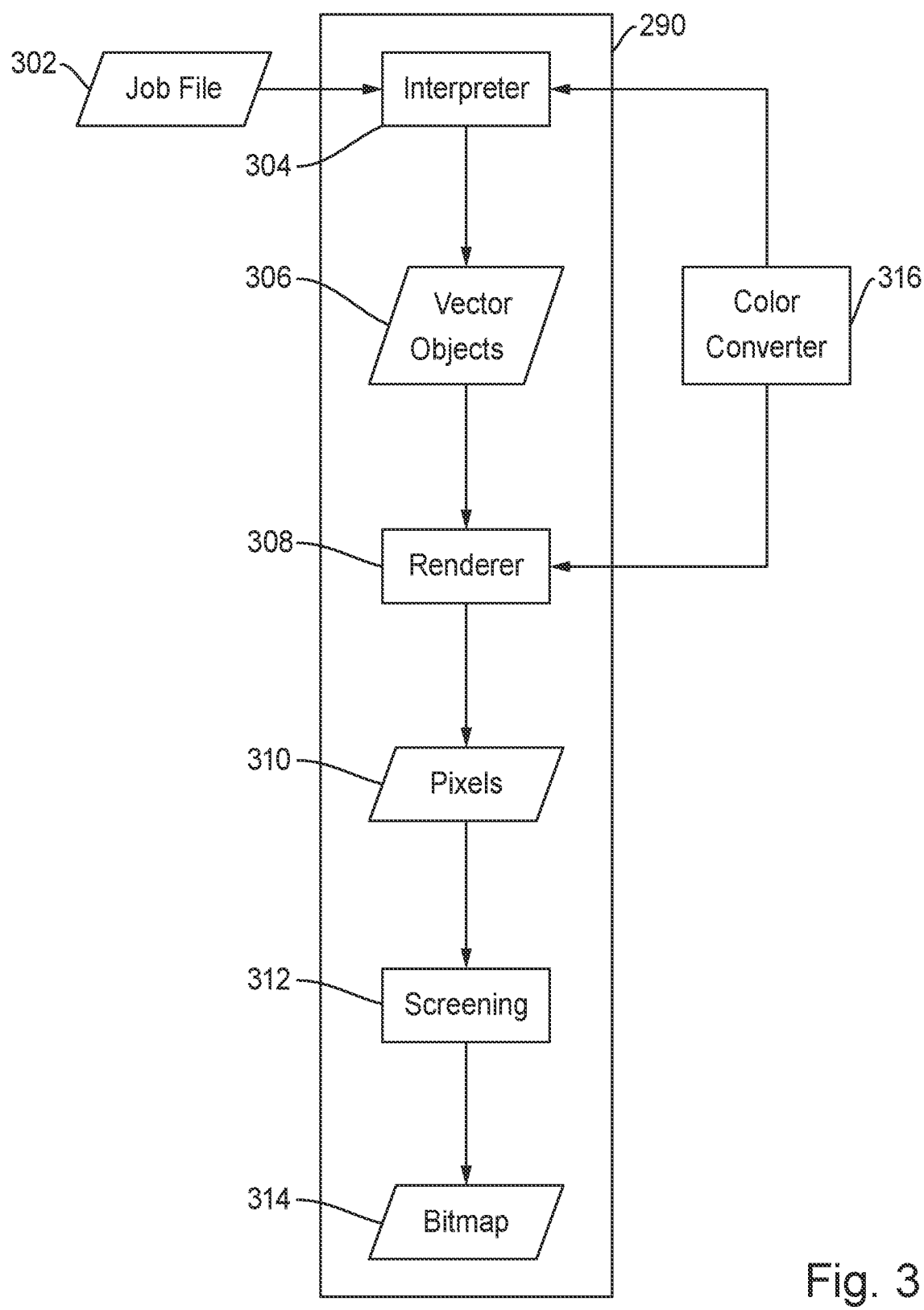
FIG. 3 illustrates a block diagram of RIP firmware used within the DFE according to the disclosed embodiments.

FIG. 3 depicts a block diagram of RIP firmware 290 used within DFE 106 according to the disclosed embodiments. RIP firmware 290 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP firmware 290 may provide interpretation, rasterization, and screening.

Job file 302 may be a job file associated with print job 103. Job file 302 may be a PostScript file in code. Job file 302 may be provided to RIP firmware 290 in DFE 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may an image, a character of text, a fill, stroke, and the like and listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by print engine 260.

RIP firmware 290 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 290 may have a software version or other identification associated with it that distinguishes this version from others in system 100. Printing device 104 may implement several different RIP firmware versions depending on the type of print job 103. Further, different printing devices may implement different versions of the RIP firmware. Preferably, RIP firmware 290 is software implemented.

Figure 4A:
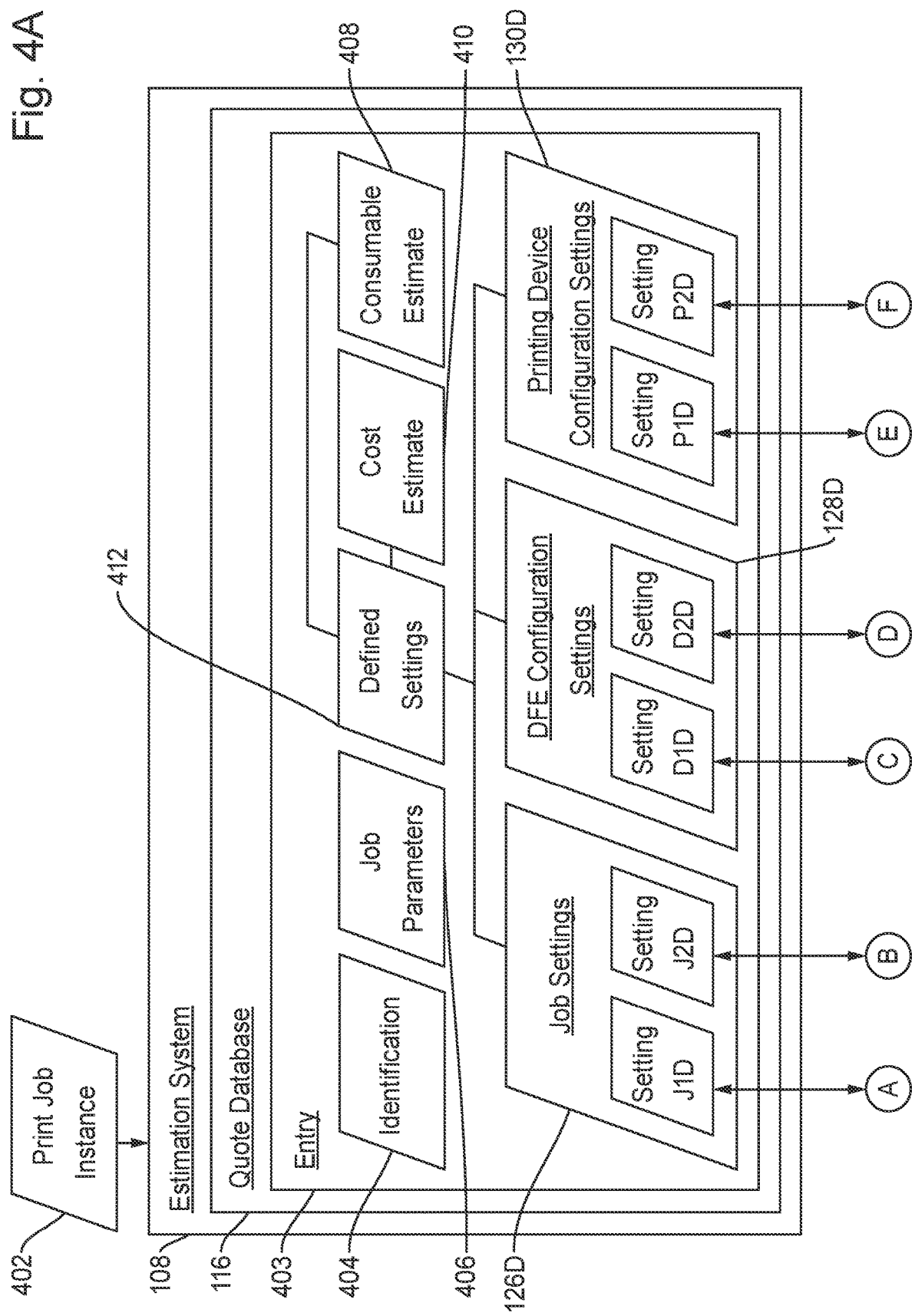
FIG. 4A illustrates a block diagram of processing a print job instance of a recurring print job using an estimation system according to the disclosed embodiments.
Figure 4B:
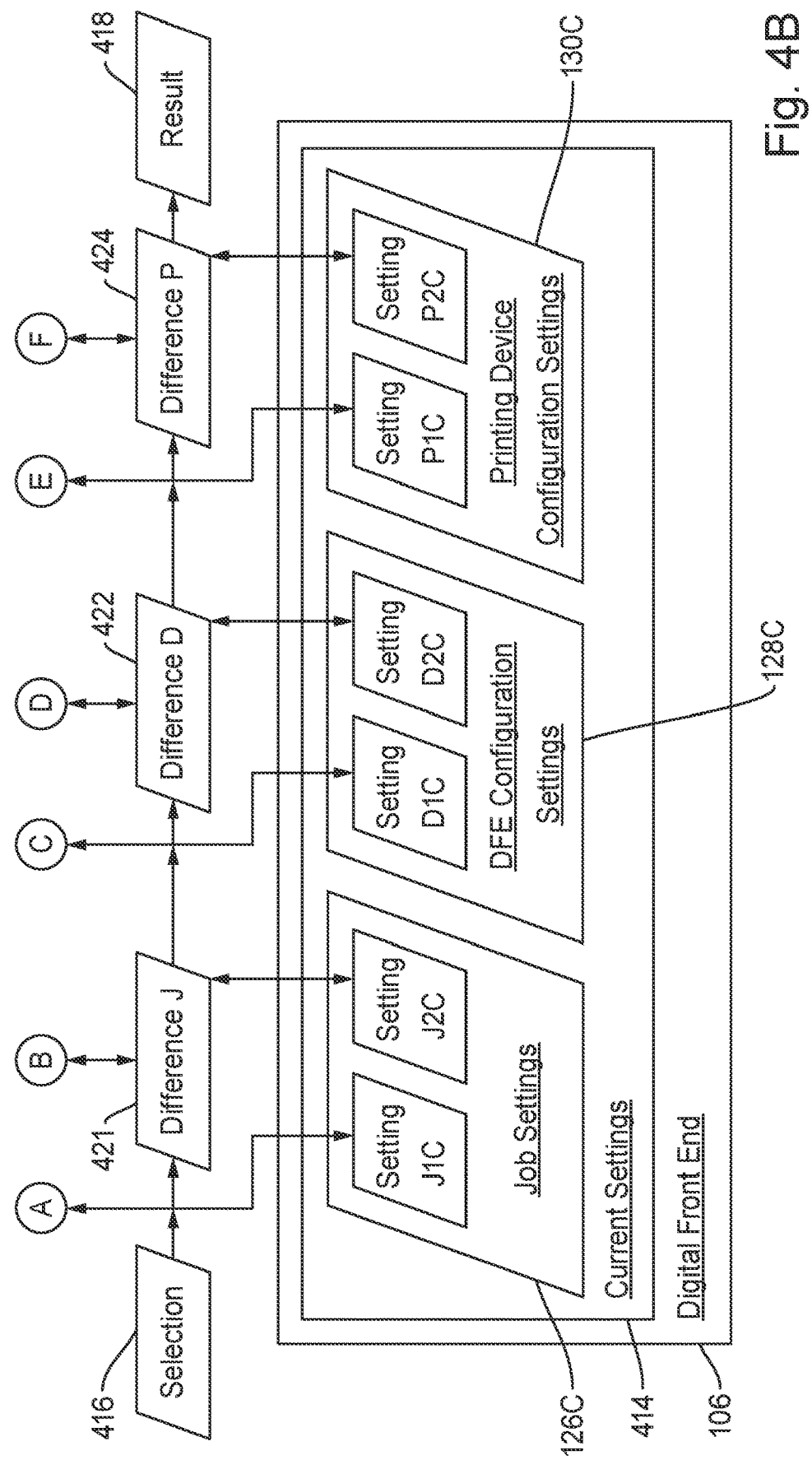
FIG. 4B further illustrates a block diagram of processing a print job instance of a recurring print job using an estimation system according to the disclosed embodiments.

FIGS. 4A and 4B depict a block diagram of processing print job instance 402 of recurring print job 103 using estimation system 108 according to the disclosed embodiments. When the operator estimates consumable use, he/she selects a target printing device and performs estimation using the settings available at that time. An entry 403 may be made in quote database 116 with the information used and determined for the estimate. FIGS. 4A and 4B illustrate an example of entry 403 including defined settings 412 used to generate the estimate. Each entry within quote database 116 may specify aspects associated with an estimate provided to a customer for processing print job 103.

Entry 403 may include an identification (ID) field 404 that may provide a unique number or alphanumeric indicator, known as an ID, for the estimate provided for print job 103. The ID may be generated by estimation system 108. Alternatively, the ID may be provided by system 100 to track between the devices within the system. Job parameters field 406 may include client information associated with print job 103. It also may include information indicative of the printing operations for print job 103. For example, print job 103 is a recurring print job in that it is printed repeatedly according to job parameters 406. The parameters for recurring printing operations may be frequency, such as monthly, yearly, and the like, information regarding the size of the sample of print job 103 used to make the estimate, such as 1000 pages.

Consumable estimate field 408 for entry 403 may specify information regarding the amount of consumables 132, such as ink 134 or toner 136, estimated to be needed to print documents 105 for each instance of print job 103. For example, print job 103 may be printed monthly. Print job instance 402 may represent a specific instance, or job, that is printed at printing device 104. The value of this field may specify the amount of ink or toner of a particular color used to process print job 103. The amount may be in picoliters, for ink, or milligrams, for toner. The estimated values specified in field 408 may correspond to the entire document 105 for print job 103, the number of pages, the number of impressions, the number of sheets, and the like.

Cost estimate field 410 for entry 403 may specify the cost associated with processing print job 103. The value of this field may be proportional to the value of the estimate for consumables 132 specified for entry 403 in consumable estimate field 408 and the type of media, such as ink 134 or toner 136, determined to be used by printing device 104. The cost may be specified for each instance of print job 103 being printed for a recurring printing operation.

Entry 403 also may include defined settings 412. Defined settings 412 are those settings, disclosed above, used in generating the values in consumable estimate field 408 and cost estimate field 410. The disclosed embodiments stores defined settings 412 as a record of settings applicable at DFE 106 and printing device 104 to process print job 103 when the estimate was given. These settings include job settings 126D, DFE configuration settings 128D, and printing device configuration settings 130D. These settings correspond to job settings 126, DFE configuration settings 128, and printing device configuration settings 130, disclosed above. Defined settings 412, however, are the values for those settings when entry 403 is created.

For illustrative purposes, job settings 126D may include setting J1D and setting J2D. These settings may relate to job settings used to provide the consumable estimate. Job settings may correspond to settings set forth in print ticket settings 138 for print job 103. Examples of such settings may be quality for document 105 (draft, normal, high quality), whether to print on both sides of the sheets, monochrome versus color printing, and the like.

DFE configuration settings 128D relate to settings, usually software-related within DFE 106. These settings may be more persistent than job settings 126D as they do not potentially change with every print job. DFE configuration settings 128D, however, may be changed by an operator in DFE 106. DFE configuration settings 128D may include setting D1D and setting D2D saved with defined settings 412. DFE configuration settings 128D may relate to RIP settings or other settings within DFE 106, such as margins for specified media. Other examples may be spot color processing or other color conversion operations.

Printing device configuration settings 130D also are saved with defined settings 412. Printing device configuration settings 130D include setting P1D and setting P2D. Printing device configuration settings are more persistent than DFE configuration settings in that they related to the printing device and do not change over time. These settings may be set by the manufacturer. Examples include types of media printable at printing device 104 and maintenance on printing components.

As can be appreciated, these settings may change over time, especially if print job 103 reoccurs for an extended period of time. For example, entry 403 for print job 103 may have been completed 4-5 years prior to reception of print job instance 402. During that time, printing device 104 may degrade or settings within DFE 106 may have been changed. Further, job settings for print job instance 402 may be updated to meet new requirements or needs in printing document 105 for this particular instance. For example, print job instance 402 may specify a different size or font for document 105.

The disclosed embodiments, therefore, retrieve defined settings 412 from entry 403 when a print job instance related to print job 103 is received. Print job instance 402 is associated with print job 103 of entry 403 in quote database 116. Estimation system 108 retrieves current settings 414 from DFE 106 or printing device 104. Current settings are those currently being applied at printing device 104. Like defined settings 412, current settings 414 are related to job settings 126, DFE configuration settings 128, and printing device configuration settings 130.

Job settings 126C may be the current job settings to be used for print job instance 402. Job settings 126C include setting J1C and setting J2C, which correspond to setting J1D and setting J2D of defined settings, respectively. DFE configuration settings 128C may be the current DFE settings to apply to process print job instance 402. DFE configuration settings 128C include setting D1C and setting D2C, which correspond to setting D1D and setting D2D, respectively. Printing device configuration settings 130C may be the current printing device settings used to print document 105 for print job instance 402. Printing device configuration settings 130C include setting P1C and setting P2C, which correspond to setting P1D and setting P2D, respectively.

Estimation system 108 retrieves current settings 414 from DFE 106 and compares them to defined settings 412 to determine whether any differences exist that may impact consumable use in processing print job instance 402. These differences may cause a change to the cost to print document 105. The disclosed embodiments then may resolve any difference according to operator instruction or default actions taken to keep costs within those provided with the original estimate, as captured by entry 403.

For example, setting J1C is compared to setting J1D and setting J2C is compared to setting J2D to determine if any differences exist between defined job settings 126D and current job settings 126C. Setting D1C is compared to setting D1D and setting D2C is compared to setting D2D to determine if any differences exist between defined DFE configuration settings 128D and current DFE configuration settings 128C. Setting P1C is compared to setting P1D and setting P2C is compared to setting P2D to determine if any differences exist between defined printing device configuration settings 130D and current printing device configuration settings 130C.

The disclosed embodiments may include any number of settings to be compared. The settings shown in FIGS. 4A and 4B are for illustrative purposes. Only two settings are shown for each type for brevity. For example, DFE configuration settings may include 12-20 settings applicable to DFE 106. Printing device configuration settings may include any number of settings for printing device 104. All of these settings are compared to the defined settings for entry 403 to determine if any differences exist.

If no difference exists between the defined setting and the current setting, then the disclosed embodiments do not need to do anything except process print job instance 402. If a difference is determined, then the disclosed embodiments may take different actions. Result 418 may occur as a result of the action. In some embodiments, result 418 may be a warning that a difference is detected. The warning may be displayed by estimation system 108. The warning may prompt the operator to make a selection 416 on which setting to apply in processing print job instance 402.

For example, difference J 421 is detected between defined job setting J2D and current job setting J2C. For result 418, estimation system 108 may display a warning to the operator. The operator may elect with selection 416 to update all job settings 126C to match those used for entry 403, or job settings 126D. Alternatively, the operator may select that job setting J2C be kept for print job instance 402. In some embodiments, estimation system 108 may be instructed to apply all defined job settings when a difference is detected, to override the current job settings to match those originally used to determine the cost estimate for entry 403.

Difference D 422 may be detected between defined DFE configuration setting D2D and current DFE configuration setting D2C. For result 418, estimation system 108 may display a warning to the operator. The operator may elect using selection 416 to update current DFE configuration settings 128C to match DFE configuration settings 128D used to provide the consumable estimate. Alternatively, the operator may elect using selection 416 to use current DFE configuration settings 128C, in a sense overriding defined DFE configuration settings 128D. It should be noted that defined DFE configuration settings 128D are not modified or changed to current DFE configuration settings 128C in entry 403.

Difference P 424 may be detected between defined printing device configuration setting P2D and current printing device configuration setting P2C. For result 418, estimation system 108 may display a warning to the operator. Due to difference P 424, the operator may elect using selection 416 to update printing device configuration settings 130C to match defined printing device configuration settings 130D. An update to printing device settings usually requires entering maintenance mode and restarting printing device 104. Estimation system 108 may allow the operator to update all settings at once, such as with a single click, and restart printing device 104. Alternatively, the operator may elect to process print job instance 402 using current printing device configuration settings 130C, essentially overriding defined printing device configuration settings 130D.

After the settings are determined for print job instance 402, document 105 is produced for this recurring operation of print job 103. The document is printed on the specified media at printing device 104. DFE 106 may compile the amount of consumables 132 used to produce document 105 using the specified settings. FIG. 5 depicts a block diagram of post-print operations using estimation system 108 according to the disclosed embodiments.

After document 105 is printed, printing device 104, using DFE 106, may send job costing information 502 to estimation system 108. Estimation system 108 retains a printing history for all defined projects, such as recurring print job 103. Estimation system 108 may add another print event to the history for the project, shown by entry 403, with which print job 103 is associated. Referring to FIG. 5, entry 403 is saved within quote database 116, as disclosed above. In addition to the features disclosed in FIGS. 4A and 4B, entry 403 may include print event entries that stored the history of the print job instances processing on a recurring basis. For example, print job 103 may have been printed twice already, as shown by print event 504 and print event 506. The associated information, history, and status are stored for each print event.

After printing document 105 for print job instance 402, estimation system 108 adds print event 508 to entry 403. Print event 508 includes job costing information 502 provided by printing device 104. Job costing information 502 may include data on how consumables 132 were used in printing document 105. For example, consumables 132 may be allocated to good, auxiliary, quality control, color control, maintenance, paper jams, waste, blank pages, equipment malfunction, and the like. For example, it may be reported that 20% of consumables 132 are not used in actual printing, but in wasteful categories, such as paper jams. These factors also influence ink or toner use apart from settings applied using the processes disclosed above. Further, job costing information 502 may include applicable settings used in processing print job instance 402. This information may be useful in tracking how consumables 132 are used in print jobs.

In addition, estimation system 108 will store status 510 for print event 508. Status 510 is status information for the print event for print job 103. It may indicate whether the printing operation was successful at meeting cost estimate goals for print job 103. For example, if it is determined that print job instances are consistently exceeding the cost estimate determined for print job 103, then the print shop may be losing profit and needs to address any potential problem causing the increased consumable use. The increased use may relate to settings applied, as disclosed above, or other factors captured by job costing information 502. Status 510 provides a quick indication of how effective a print event was at meeting cost and consumable estimate objectives.

A status 510 of acceptable, or "okay," indicates that print job instance 402 for print event 508 was printed using the same job settings, DFE configuration settings, and printing device configuration settings as were used for estimation. In other words, no deviation occurred between settings for the current print job instance and the ones used to generate the estimate for entry 403. This status also may indicate that the actual costs were the same or less then the costs from the initial estimate, as provided in cost estimate field 410. In some embodiments, a specified margin of error may be defined so that even if the costs for the print job instance exceed the initial estimate, it still is acceptable as long as the costs are within the margin. For example, estimation system 108 may allow for a margin of 5% over the initial estimate cost to still be considered having a status 510 of acceptable.

A status 510 of warning may indicate several situations. A warning status may indicate that print job instance 402 was processed and document 105 printed using different job settings, different DFE settings, or different printing device configuration settings than the defined settings in entry 403. A warning status also may be used if job costs were higher than the costs provided by the estimation for print job 103 and stored with entry 403. Job costs, however, were lower than a margin for the print job instance. This status means the print job instance was less profitable than desired, but the print job instance still was processed and printed at a profit. Print events where document 105 was printed using correct settings and costs were still higher may indicate to the print shop that there is problem to be addressed. More information on this problem may be found in job costing information 502.

A status 510 of error indicates that job costs where higher than the estimated costs of entry 403, even above any specified margin. This status indicates that the print shop actually lost money when printing print job instance 402. Print shops may want to address print events having an error status as soon as possible. An alert may be provided by estimation system 108 when such a status is determined. It should be noted that margin may relate to how high the increased cost may rise before a loss is sustained for a print job instance. Thus, the margin may not be related to percentages or acceptable levels, but a specified value.

Estimation system 108 also provides project functionality. It may provide project reports 512 that display the average ink or toner use and costs per page for every print event for the print job instances for print job 103. A report 512 also may provide the status for each print event. The operator may drill down and see details for each print event. These details may be based on job costing information 502 and include a number of sheets or pages, impressions, paper, color management, as well as all relevant settings. Report 512 also may be a warning or error notification automatically sent to defined operators when a print event has a warning or error status.

Figure 6:
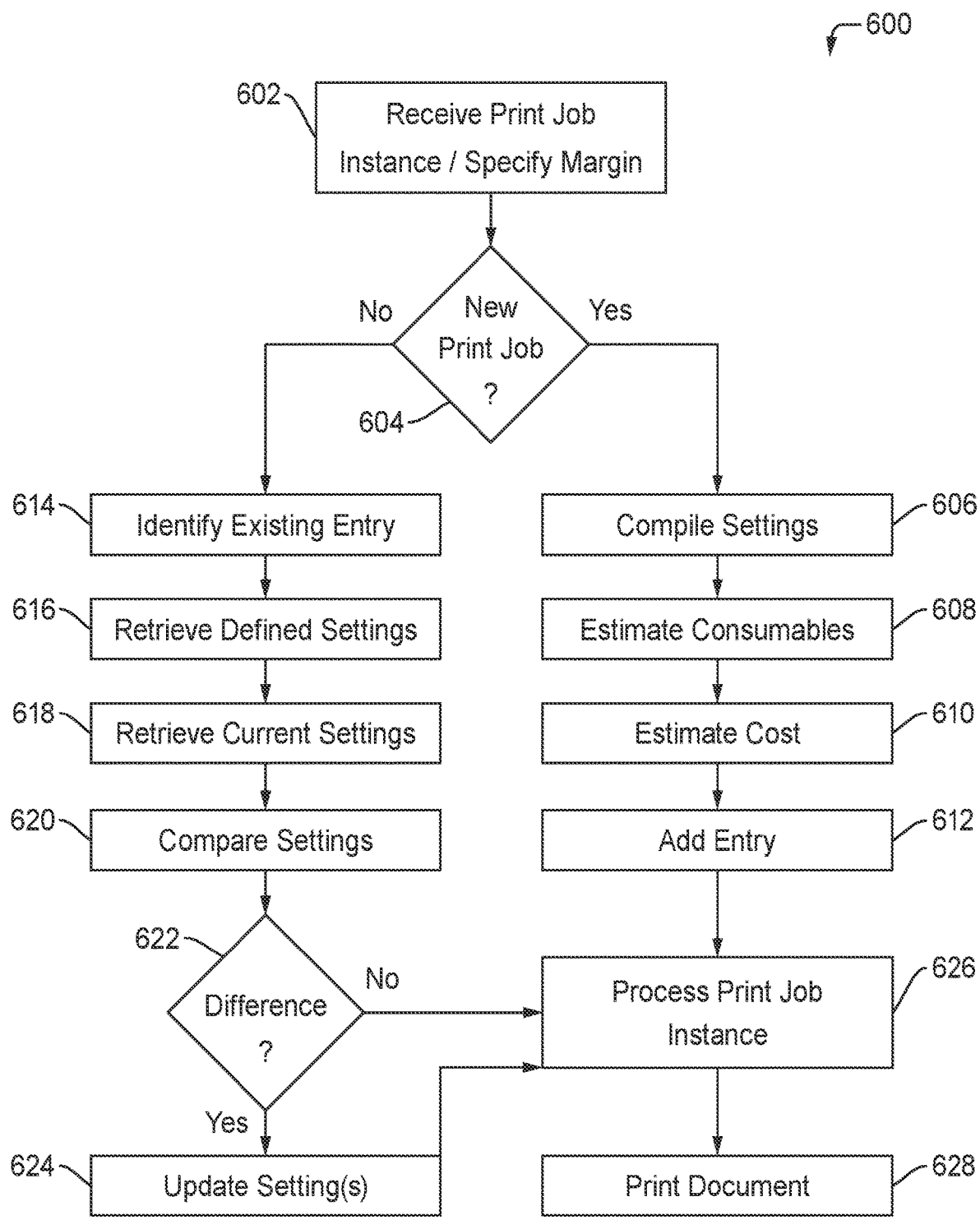
FIG. 6 illustrates a flowchart for using defined settings and current settings in printing operations according to the disclosed embodiments.

FIG. 6 depicts a flowchart 600 for using defined settings 412 and current settings 414 in printing operations according to the disclosed embodiments. Flowchart 600 may refer to FIGS. 1A-5 for illustrative purposes. Flowchart 600, however, is not limited to the embodiments disclosed by FIGS. 1A-5.

Step 602 executes by receiving print job instance 402 at estimation system 108 or within system 100. Print job instance 402 is a recurring print event for print job 103. Print job instances may be received repeatedly over a period of time to produce a document 105. Print job instances may vary based on some content but overall are similar. Step 602 also may specify a margin to be assumed for the print job instance. The margin is an uplift to the actual cost which is used to provide the cost estimate for print job 103.

Step 604 executes by determining whether print job instance 402 is a new print job. Estimation system 108 checks quote database 116 to determine whether an entry exists for a print job project that corresponds to the received print job instance. If it is a new print job, then flowchart 600 executes steps 606-612. Step 606 executes by compiling settings from DFE 106 and target printing device 104. These settings include job settings 126, DFE configuration settings 128, and printing device configuration settings 130. These are disclosed in greater above. The compiled settings are provided to estimation system 108.

Step 608 executes by estimating consumables 132 that will be needed to process and print the print job instance at printing device 104. These processes are disclosed in greater detail above. Consumables 132 may include ink 134 or toner 136. Using the consumable estimate, step 610 executes by estimating the costs to produce the print job instance, or the print job. Step 612 executes by adding entry 403 into quote database 116 for the new print job and indicating that it is recurring at printing device 104. Entry 403 also includes the settings used to determine the consumable estimate. These settings may be known as defined settings 412. Flowchart 600 proceeds to step 626, disclosed below.

If step 604 is no, then print job instance 402 corresponds to an existing entry for a print job 103 already estimated and priced using estimation system 108. Step 614 executes by identifying existing entry 403 for print job 103, which corresponds to print job instance 402. Print job instance 402 may include an ID number that corresponds to ID field 404 of entry 403.

Step 616 executes by retrieving defined settings 412 for job settings 126D, DFE configuration settings 128D, and printing device configuration settings 130D stored with entry 403. These settings match the settings used by estimation system 108 to generate the consumable and cost estimates for the print job. Step 618 executes by retrieving current settings 414 from DFE 106 and printing device 104. Current settings 414 are the settings found on printing device 104 at the time print job instance 402 is to be processed and printed. Current settings 414 include job settings 126C, DFE configuration settings 128C, and printing device configuration settings 130C. As disclosed above, the settings currently on printing device 104 and in DFE 106 should correspond to a setting used to determine the consumable and cost estimates.

Step 620 executes by comparing defined settings 412 to current settings 414. Each current setting may be matched against a defined setting. The disclosed embodiments seek to determine if any differences exist between the defined settings and the current settings. Step 622 executes by determining whether one or more differences exist between settings. If yes, then step 624 executes by updating the current settings with the defined settings. Alternatively, step 624 may allow the operator to select whether to update the settings associated with the difference. In other embodiments, the current setting may be applied if a difference is detected. Estimation system 108 may have a default setting to determine how to treat settings that have differences. Other actions also may be taken, as disclosed above, such as restarting printing device 104. Flowchart 600 proceeds to step 626.

If step 622 is no, then no differences exist between defined settings 412 and current settings 414. DFE 106 and printing device 104 should operate under the same conditions as those used for estimating consumable use for entry 403. Step 626 executes by processing print job instance 402 at DFE 106. Estimation system 108 may indicate to printing device 104 that is acceptable to begin processing along with any updates to current settings 414. Step 628 executes by printing document 105 for print job instance 402 at printing device 104.

Figure 7:
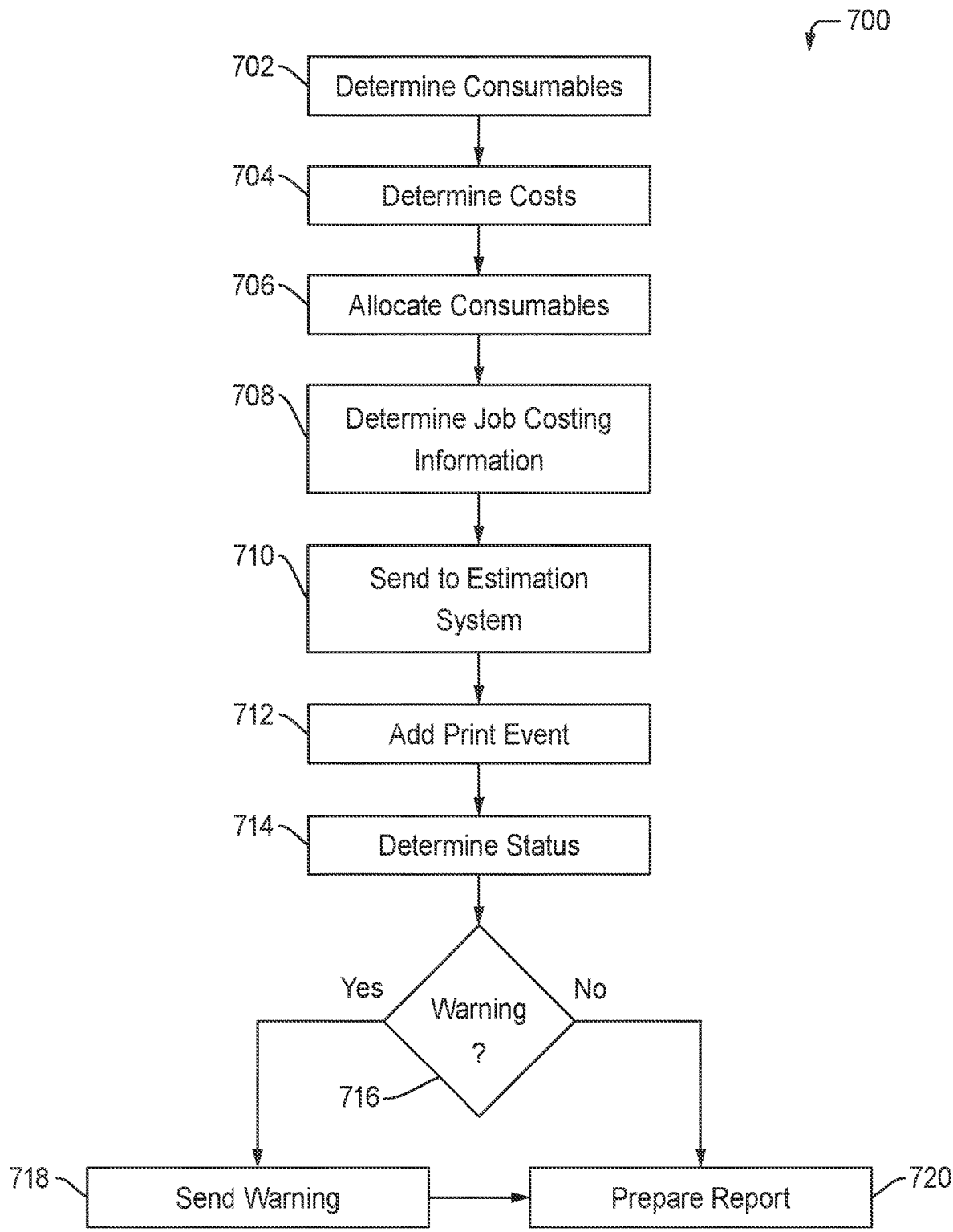
FIG. 7 illustrates a flowchart for recording a print event for the printed document at the estimation system according to the disclosed embodiments.

FIG. 7 depicts a flowchart 700 for recording a print event 508 for the printed document at estimation system 108 according to the disclosed embodiments. Flowchart 700 may refer to FIGS. 1A-6 for illustrative purposes. Flowchart 700, however, is not limited to the embodiments disclosed by FIGS. 1A-6.

Step 702 executes by determining consumables 132 used to print document 105 based on print job instance 402. Ink 134 or toner 136 is used to print the document. Other consumables also are used, such as sheets or impressions. DFE 106 may track the usage of consumables within printing device 104. Step 704 executes by determining the costs for print document 105 based on the amount of consumables 132 used. For example, document 105 may have used 12 picoliters of ink 134. This amount is used to determine the cost for producing document 105 for print job instance 402.

Step 706 executes by allocating the consumables determined to be used to job costing categories. As disclosed above, job costing data may be determined for acceptable printed sheets and sheets not related to printing document 105, such as auxiliary sheets or sheets lost in paper jams. The ink or toner used by the different job costing categories is determined. Step 708 executes by determining job costing information 502 based on the allocated consumables to the job costing categories. Job costing information 502 also may include settings used to process print job instance 402 and print document 105. It also may include the margin specified in step 602, disclosed above.

Step 710 executes by sending job costing information 502 to estimation system 108. Preferably, DFE 106 may determine job costing information 502. Alternatively, data compiled for printing document 105 may be sent to estimation system 108, which then determines the job costing information. Step 712 executes by adding print event 508 to entry 403 for print job instance 502. As print job instance 502 is a recurring printing operation of print job 103, the results from the printing operation is kept with the associated entry. Thus, estimation system 108 keeps a persistent history of recurring printing operations for print job 103. Print event 508 may include job costing information 502 as well as any changes in settings applied if upon the detection of differences.

Step 714 executes by determining a status 510 for print event 508. The different types of statuses may include acceptable, or okay, warning, or error. The definitions for these status types are disclosed above. The disclosed embodiments may analyze the costs determined in step 704 to the estimated cost in cost estimate field 410 of entry 403. If the determined costs for print event 508 are higher than the estimated cost, then a warning or error status may be determined. A warning status is applicable if the determined costs are within the specified margin. An error status is applicable if the determined costs are outside the margin. The error status indicates that print event 508 possibly lost money on print job instance 402.

Step 716 executes by determining whether a warning should be sent to the operator. In some embodiments, a status 510 of warning or error will trigger a warning being displayed by estimation system 108 to alert the operator of possible problems within printing device 104. If step 716 is yes, then step 718 executes by sending the warning. If step 716 is no, then flowchart 700 proceeds to step 720, which executes by preparing report 512 as disclosed above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for printing operations, the method comprising:
storing defined settings related to an existing ink estimate for a recurring printing operation of a print job within a printing system;
receiving a recurring instance of the print job for the recurring printing operation within the printing system, wherein the print job is to be processed at a printing device within the printing system;
retrieving the defined settings related to the existing ink estimate for the recurring printing operation stored at an estimation system for the printing system;
comparing the defined settings for the existing ink estimate of the recurring printing operation to current settings stored at the printing device at the time the recurring instance is received, the current settings configured to process the print job of the recurring printing operation;
determining a difference between one of the defined settings for the existing ink estimate for the recurring printing operation retrieved from the estimation system and one of the current settings stored at the printing device, wherein the difference results in a change in ink use from the existing ink estimate;

updating the one of the current settings to the one of the defined settings retrieved from the estimation system based on the difference; and printing the print job for the recurring printing operation.

2. The method of claim 1, further comprising determining job cost information for the recurring printing operation of the print job.

3. The method of claim 2, further comprising adding a print entry for the recurring printing operation for the print job into a print history, wherein the print entry includes the job cost information.

4. The method of claim 3, further comprising determining a status for the recurring printing operation with the print entry.

5. The method of claim 1, wherein the defined settings include digital front end (DFE) configuration settings for the printing device that affect ink use for the print job.

6. The method of claim 1, wherein defined settings include printing device configuration settings that affect ink use for the print job.

7. A method for printing operations, the method comprising:

storing defined settings related to an existing ink estimate for a recurring printing operation of a print job within a printing system;

receiving a recurring instance of the print job for the recurring printing operation within the printing system, wherein the print job is to be processed at a printing device within the printing system;

retrieving the defined settings related to the existing ink estimate for the recurring printing operation stored at an estimation system for the printing system;

comparing the defined settings for the existing ink estimate of the recurring printing operation to current settings stored at the printing device at the time the recurring instance is received, the current settings configured to process the print job of the recurring printing operation;

determining a difference between one of the defined settings for the existing ink estimate for the recurring printing operation retrieved from the estimation system and one of the current settings stored at the printing device, wherein the difference results in a change in ink use from the existing ink estimate;

selecting whether to match the one of the current settings to the one of the defined settings retrieved from the estimation system based on the difference; and printing the print job for the recurring printing operation.

8. The method of claim 7, further comprising determining job cost information for the recurring printing operation of the print job.

9. The method of claim 7, wherein the defined settings include digital front end (DFE) configuration settings for the printing device that affect ink use for the print job.

10. The method of claim 7, wherein defined settings include printing device configuration settings that affect ink use for the print job.

11. The method of claim 7, further comprising adding a print entry for the recurring printing operation for the print job into a print history, wherein the print entry includes the job cost information.

12. The method of claim 11, further comprising determining a status for the recurring printing operation with the print entry.

13. The method of claim 11, wherein the selecting includes overriding the current settings with the defined settings.

14. A method for printing operations, the method comprising:

storing defined settings related to an existing ink estimate for a recurring printing operation of a print job within a printing system;

receiving a recurring instance of the print job for the recurring printing operation within the printing system, wherein the print job is to be processed at a printing device within the printing system;

retrieving defined settings related to the existing ink estimate for the recurring printing operation of a plurality of recurring printing operations stored at an estimation system for the printing system;

comparing the defined settings for the existing ink estimate for the recurring printing operation retrieved from the estimation system to current settings stored at the printing device at the time of the recurring instance is received, the current settings configured to process the print job of the recurring printing operation;

determining a difference between one of the defined settings for the existing ink estimate for the recurring printing operation retrieved from the estimation system and one of the current settings stored at the printing device, wherein the difference results in a change in ink use from the existing ink estimate;

selecting whether to update the one of the current settings to the one of the defined settings retrieved from the estimation system based on the difference;

performing the recurring printing operation for the print job;

creating a print entry for the recurring printing operation of the print job, wherein the print entry includes job costing information and a status; and providing a report on the print job using the print entry for each of the plurality of recurring printing operations.

15. The method of claim 14, wherein the status includes an acceptable status that the recurring printing operation was printed using the defined settings.

16. The method of claim 14, wherein the status includes a warning status that indicates a difference was determined between one of the defined settings and one of the current settings.

17. The method of claim 14, wherein the status includes an error status wherein the job costing information indicates that costs for the recurring printing operation was above a specified amount.

18. The method of claim 14, wherein the defined settings include job settings that affect ink use for the print job.

19. The method of claim 14, wherein defined settings include printing device configuration settings that affect ink use for the print job.

20. A method for printing operations, the method comprising:

storing defined settings related to an existing ink estimate for a recurring printing operation of a print job within a printing system;

receiving a recurring instance of the print job for the recurring printing operation within the printing system, wherein the print job is to be processed at a printing device within the printing system;

retrieving defined settings related to the existing ink estimate for the recurring printing operation stored at an estimation system for the printing system;

comparing the defined settings for the existing ink estimate of the recurring printing operation to current settings stored at the printing device at the time the recurring instance is received, the current settings configured to process the print job of the recurring printing operation; and determining a status for the recurring printing operation based on a difference between one of the defined settings for the existing ink estimate for the recurring printing operation retrieved from the estimation system and one of the current settings stored at the printing device, wherein the difference results in a change in ink use from the existing ink estimate.

* * * * *